No. 818,366. PATENTED APR. 17, 1906.
A. FLORES.
MOTOR POWER MACHINE.
APPLICATION FILED OCT. 28, 1905.

3 SHEETS—SHEET 1.

Witnesses
W. N. Durand
W. Parker Reinohl

Inventor
Alfredo Flores
By D. C. Reinohl
Attorney

No. 818,366. PATENTED APR. 17, 1906.
A. FLORES.
MOTOR POWER MACHINE.
APPLICATION FILED OCT. 28, 1905.

3 SHEETS—SHEET 2.

Witnesses
W. N. Durand
W. Parker Reinohl

Inventor
Alfredo Flores
By D. L. Reinohl
Attorney

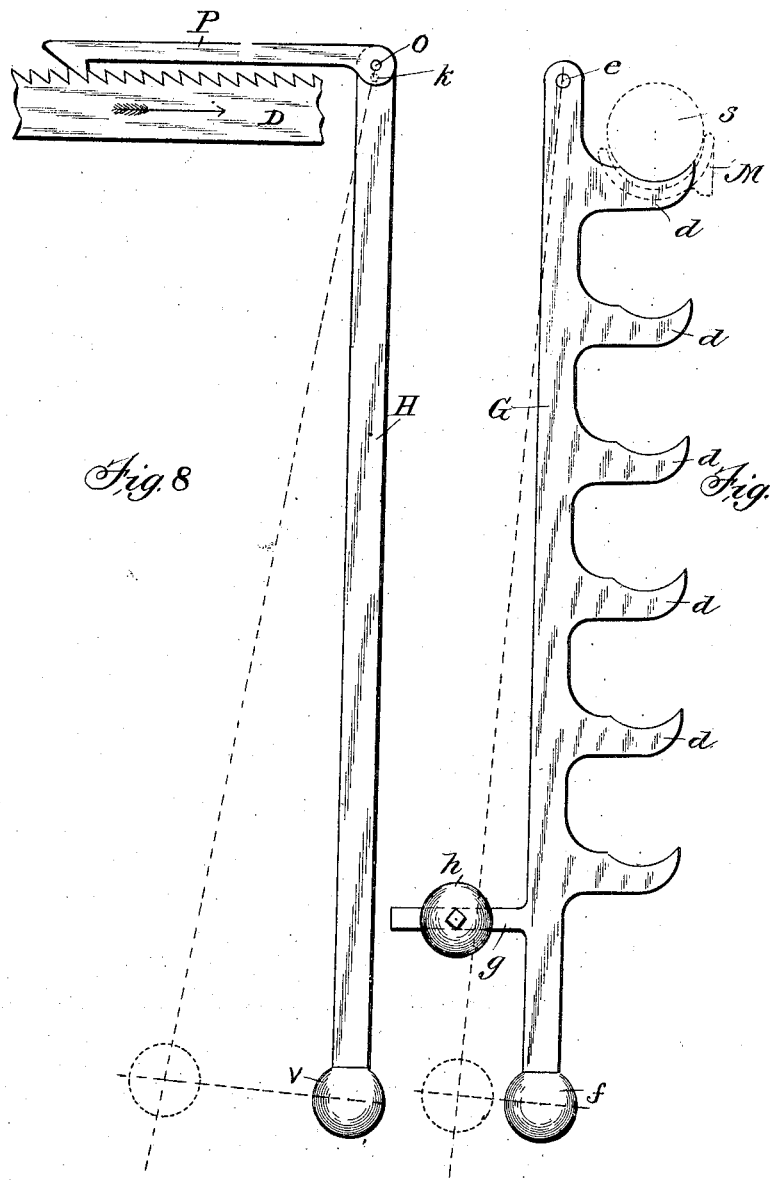

UNITED STATES PATENT OFFICE.

ALFREDO FLORES, OF NEW YORK, N. Y., ASSIGNOR OF TWO-THIRDS TO JOHN L. WEAVER, OF BOISE, IDAHO.

MOTOR POWER-MACHINE.

No. 818,366.     Specification of Letters Patent.     Patented April 17, 1906.

Application filed October 28, 1905. Serial No. 284,915.

*To all whom it may concern:*

Be it known that I, ALFREDO FLORES, a citizen of the United States, residing at New York city, in the county of New York and State of New York, have invented certain new and useful Improvements in Motor Power-Machines; and I do hereby declare the following to be a full, clear, and exact description of the invention, such as will enable others skilled in the art to which it appertains to make and use the same.

My invention relates to motors, has especial reference to that class of motors which are impelled by gravity, has for its object the utilization of certain well-known laws of nature and principles in mechanics, such as gravitation, leverage, and the screw; and the invention consists in certain improvements in construction, which will be fully disclosed in the following specification and claims.

Figure 1:
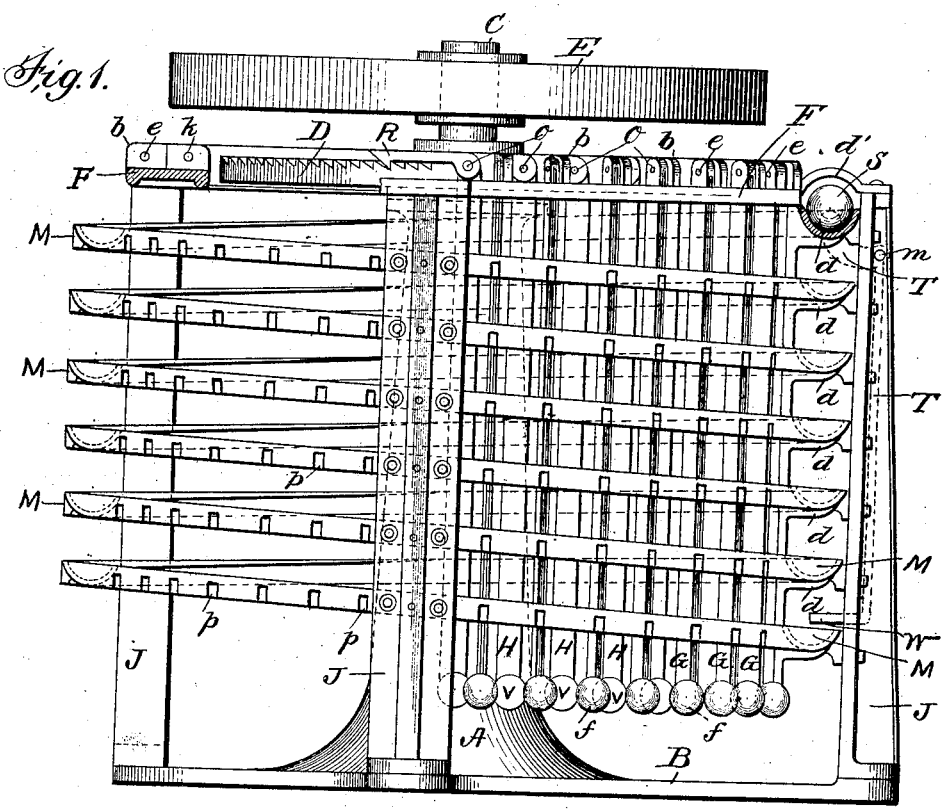
Figure 3:
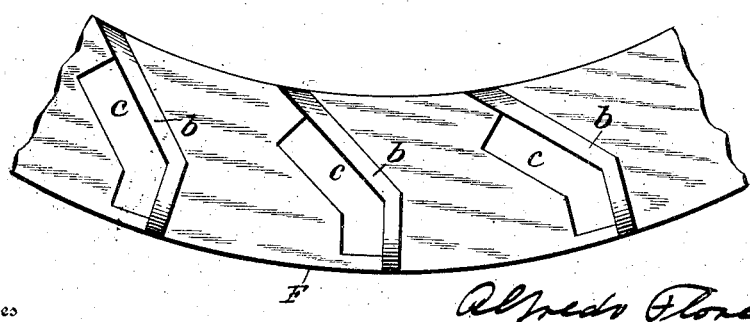
Figure 2:
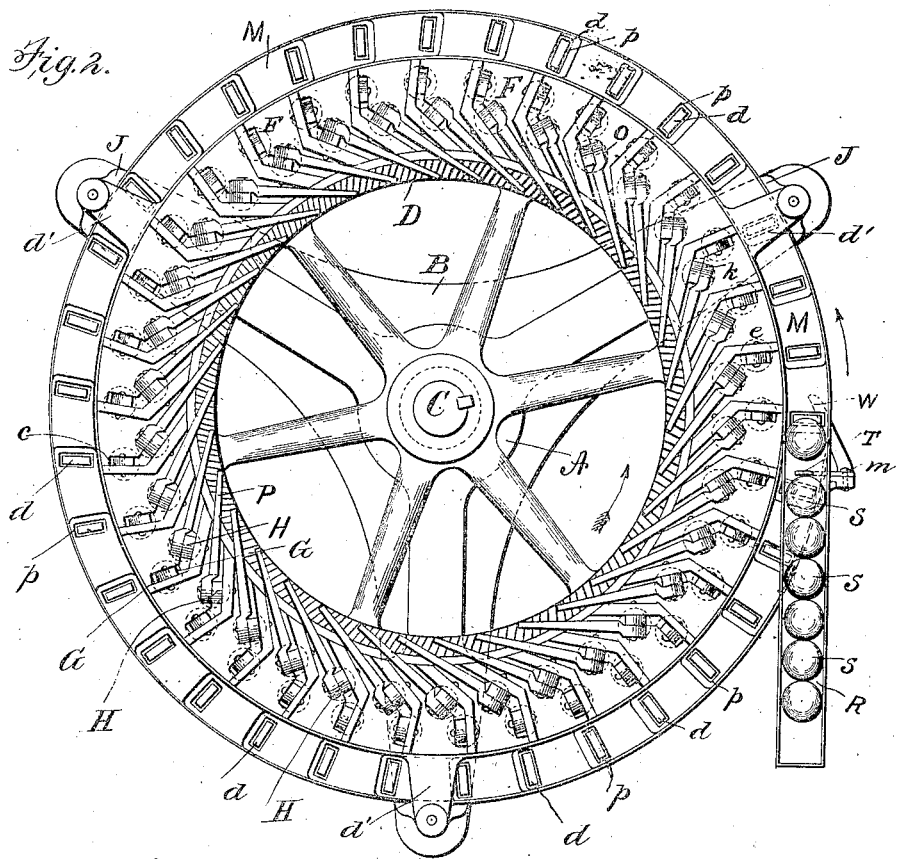
Figure 4:
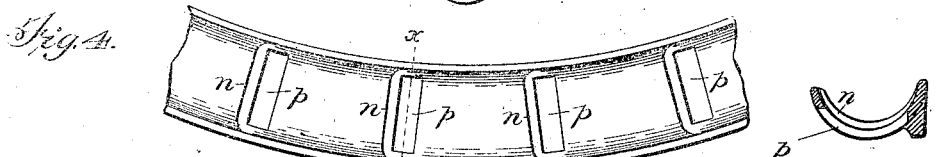
Figures 5, 6:
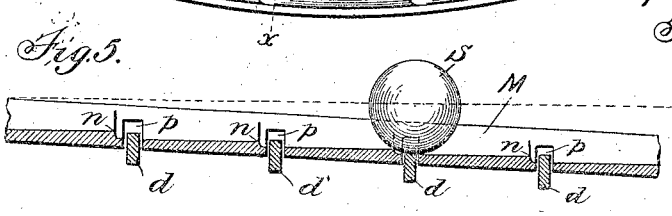

In the accompanying drawings, which form part of this specification, Figure 1 represents a side elevation, partly in vertical section; Fig. 2, a top plan view with flywheel removed; Fig. 3, an enlarged plan of a section of the top plate; Fig. 4, a like view of a section of the track or ball-race; Fig. 5, a vertical longitudinal section of the same; Fig. 6, a transverse section of the same on line X X, Fig. 4; Fig. 7, an enlarged elevation of one of the trip-levers detached; and Fig. 8, a like view of one of the pawl-levers, the pawl, and part of the rack.

Reference being had to the drawings, and the designating characters thereon, A indicates a hollow vertical column provided with a base B; C a vertical power-shaft mounted in the column and provided with suitable bearings. (Not shown.) On the upper end of the shaft is secured a ratchet-wheel D and a flywheel or pulley-wheel E, from which power is transmitted by a belt (not shown) for any purpose desired.

F indicates an annular plate which is provided with pivot-lugs b and slots c for attaching levers G and H thereto, and from the periphery of plate F extend three or more brackets d', resting upon the supporting-columns J, which are secured to the base B. The levers G are pivoted to the lugs b at e, are suspended therefrom, and extend down the slots e in a vertical position. The outer edges of said levers G are provided with a series of arms d, and to the lower end is secured a weight f, preferably spherical in form. The opposite or inner edges of the levers are provided with an arm g, to which is adjustably attached a weight h, which acts as a counterbalance for arms d and causing the levers G to remain in perpendicular line when at rest. The levers H are also pivoted to the lugs b at k and extend down through the slot c in a vertical position, the said levers being provided with a weight or ball v at their lower end, and to the upper end of said levers is attached a pawl P, the pivot O for the pawls being placed above the pivot k, which becomes the fulcrum for the levers. The free end of the pawl P engages the teeth on the upper edge of the rim of the wheel D.

Surrounding the levers G and H is a spiral track or ball-race M, which is secured to and supported by the column J. This race extends around the levers several times for the passage and guiding of the gravity-balls S. The race is provided with slots p to receive the arms d on the levers G, and in the bottom of said race is formed a series of inclined steps n, as shown in Fig. 4.

R is an incline or trough for supporting the balls S, and the balls are held in place by an arm T, which is pivoted to column J at m and extends down to the lower end of the raceway. The lower end w of the arm is formed to lay across the passage-way of the balls S, as shown in Figs. 1 and 2.

The machine being constructed substantially as described, the operation is as follows: The balls S are placed in the receptacle R by any suitable means and held at rest by the stop T. The stop is depressed or lowered by hand or otherwise and one of the balls S released, when it will start to roll down the spiral race M, the stop T returning to its normal position holds the other balls in the trough or receptacle R. The ball which has been released travels down the inclined race to the first step n, and in falling to the next incline or step it strikes against the arm d, as shown in Fig. 5, which swings the lever G toward the center of the machine in a radial line, as shown in dotted lines in Fig. 7. The ball in its course coming in contact with ball v on lever H forces it tangentially toward the center of the machine. The forward motion of the lever H causes the pawl P at its upper end to move in the opposite direction, and the free end of the pawl being engaged in the teeth of the ratchet-wheel D will draw the wheel forward, giving impulse to all that is attached to the shaft C and causing it to revolve. This same operation is repeated and continued at every step n on the race until the ball reaches the bottom or end of the race, when it comes in contact with the protruding end w of the lever T, which will release the next successive ball in the receptacle R. Each ball in its course over the race produces the same result or operation until all the balls have been exhausted, when they can be replaced in the receptacle R manually or otherwise and the operation repeated.

The rapidity of impulse imparted to the ratchet-wheel D depends on the grade of the inclined raceway M, in which the balls travel. If it is desired to have more than one ball *en route* at one time, it can be accomplished by changing the arm w on the lever T to any of the passage-ways desired.

The motor may be placed in multiple and connected to a machine common to all the motors to be driven thereby.

Having thus fully described my invention, what I claim is—

1. A gravity-motor having an inclined track or race, a power-shaft, levers projecting into said track, means for transmitting power from said levers to said shaft, and a movable body engaging the levers.

2. A gravity-motor having a plurality of vertical levers pivotally secured and provided with arms, an inclined track or race in which said arms project, a power-shaft, means for transmitting power from said levers to said shaft, and a movable body engaging the track.

3. A gravity-motor having an annular plate, a plurality of levers pivotally connected to said plate and provided with laterally-extending arms, a track or race having slots therein in which said arms project, a power-shaft, means for transmitting power from said levers to said shaft, and a movable body engaging the track and the arms on said levers.

4. A gravity-motor having an inclined track or race provided with slots, inclined steps adjacent to said slots, a plurality of vibratory levers having arms projecting into said slots, a power-shaft, means for transmitting power from said levers to said shaft, and a movable body in said track.

5. A gravity-motor having an inclined track or race, levers projecting into said track, a power-shaft having a ratchet-wheel secured thereto, levers having pawls engaging the ratchet-wheel, and a movable body in said track.

6. A gravity-motor having a vertical power-shaft, vibratory levers, a spiral track or race surrounding said shaft and levers, and in which the levers project, means for transmitting power from said levers to said shaft, and a movable body in said track.

In testimony whereof I affix my signature in presence of two witnesses.

ALFREDO FLORES.

Witnesses:
  BENJ. A. DARE,
  JOHN L. WEAVER.